Oct. 18, 1932.　　　V. BENDIX　　　1,882,746
ELECTROMAGNETIC EQUALIZING BRAKE
Filed July 7, 1928
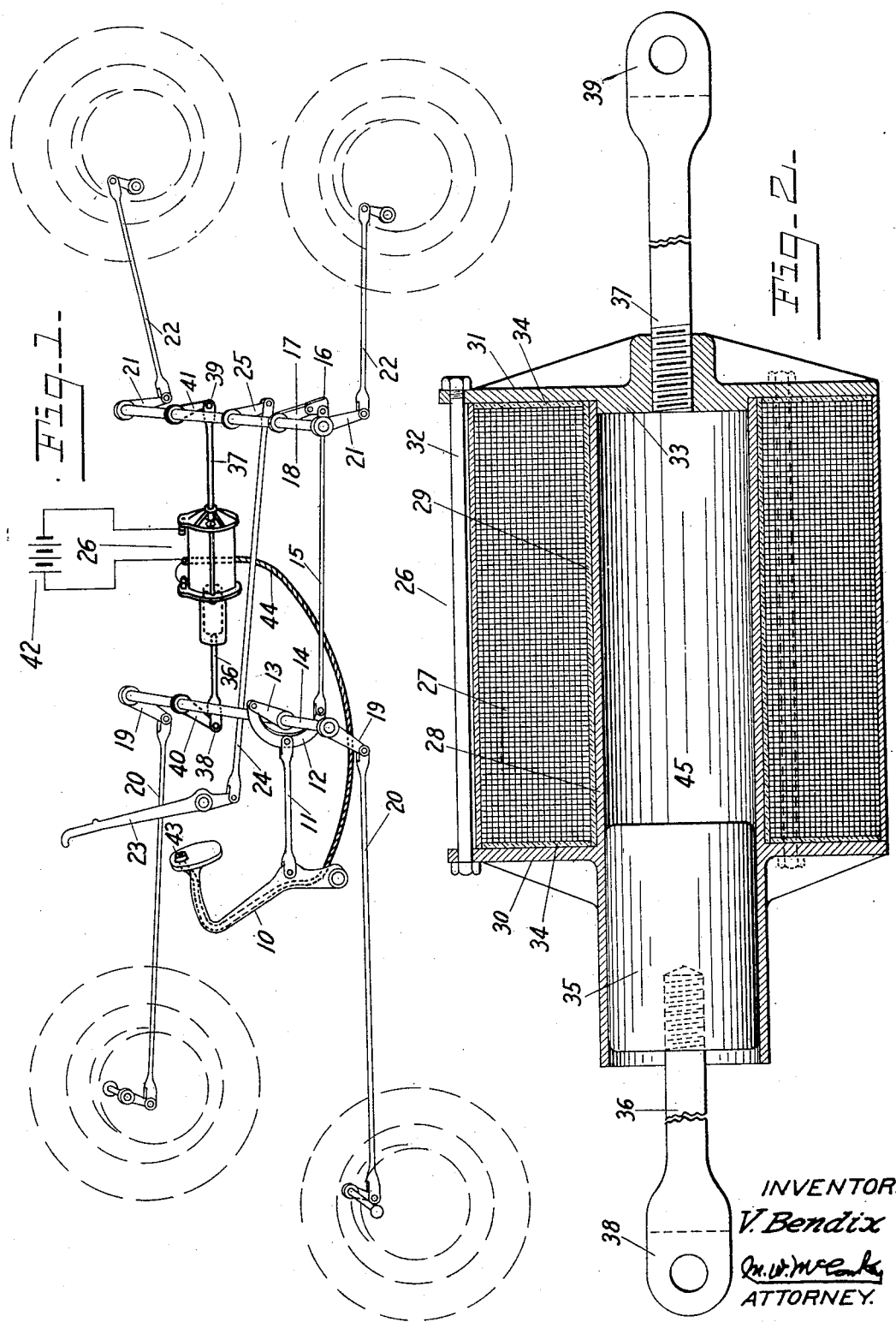
INVENTOR.
V. Bendix
M. W. McConky
ATTORNEY.

Patented Oct. 18, 1932

1,882,746

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

ELECTROMAGNETIC EQUALIZING BRAKE

Application filed July 7, 1928. Serial No. 291,047.

My invention relates to automotive four wheel brakes having equalizing mechanism between the front and rear brakes and has special reference to those which employ a power device to operate them or to assist the manual means usually provided for that purpose.

The object of my invention is to so place an electro-magnetic power means in the brake applying linkage that it will function as an equalizing means by simple connection thereto without further complicating the equalizing means employed in mechanically operated brakes.

This and other objects are attained by providing and arranging mechanism as shown in the accompanying drawing, wherein—

Fig. 1 shows the conventional hookup for mechanically operated equalizing brakes with my invention applied thereto.

Fig. 2 shows the electro-magnetic structure to an enlarged scale.

Similar numerals refer to similar parts thruout the drawing.

In the drawing the brake pedal 10 is connected by rod 11 to equalizing link 12 which connects directly to arm 13 on front brake shaft 14 and thru rod 15 and overrunning link 16 to arm 17 on rear brake shaft 18.

Front brake shaft 14 operates the forward brakes thru arms 19 and rods 20 while rear brake shaft 18 operates the rear brakes thru arms 21 and rods 22.

The manual effort applied to pedal 10 may be divided between the front and rear brakes in any desired proportion by varying the ratio between the lengths of arms 13 and 17. The emergency lever 23 connects by rod 24 and arm 25 to rear brake shaft 18.

The brake linkage described in the foregoing without more is not new, but is employed as a convenient form to combine with my improvement, which consists of the electro-magnetic structure 26 shown to an enlarged scale in Fig. 2, and the manner of connecting it in the linkage to divide its effort in any desired proportion between the front and the rear brakes.

For the magnetic structure a coil 27 is wound on a tube 28 with insulation 29 between. One end flange 30 is an integral part of tube 28 and the other end flange 31 is held against the end of the tube and in concentric relation therewith by bolts 32 and dowel portion 33 respectively. Insulation washers 34 separate the coil from the flanges 30 and 31. A core 35 is fitted to slide freely in the inner diameter of tube 28, and rods 36 and 37 ending in clevises 38 and 39 are threaded into core 35 and flange 31 respectively.

The arrangement whereby the magnetic structure is made to function as an equalizing means is shown in Fig. 1, where clevis 38 is pivoted to an arm 40 on front brake shaft 14 while clevis 39 is pivoted to an arm 41 on rear brake shaft 18. The lengths of arms 40 and 41 may be made any desired ratio to each other in order to suitably divide the magnetic effort between the front and rear brakes. A battery, shown diagrammatically at 42, provides current for coil 27 and any suitable switch 43 placed on pedal 10 and connected to the coil by a two-wire cable 44 will serve to control the current.

When the operator depresses pedal 10 he manually applies the brakes in the conventional manner by the conventional linkage shown, but simultaneously with the manual application he depresses switch 43 whereupon the circuit is completed and battery 42 feeds current to coil 27, so that core 35 is drawn into the space 45 within the coil.

Now, if the solenoid coil 27 were fixed on the chassis, and core 35 alone were movable, some form of equalizing linkage like that represented by parts 11 to 18 inclusive, would have to be provided. But since the coil 27 and core 35 are equally movable it follows that the energy results in equal tension in rods 36 and 37, which is divided between the front and rear brakes in such proportion as the length of arm 40 bears to the length of arm 41, and this result is had without the equalizing mechanism usually employed.

While in the foregoing description and drawing I have disclosed an embodiment of my invention, I do not wish to limit myself to the exact disclosure shown, for while I have shown a battery as a source of current supply, I may use a dynamo electric machine instead, and while I show a solenoid as a suitable magnetic structure, any magnetic means having two relatively movable elements may be employed, and while I indicate that manual and magnetic means are to be together employed to operate the brakes, the manner of connecting my magnetic means in the linkage will be equally advantageous where the brakes are to be operated by magnetic means alone.

I am aware that prior to my invention manual and magnetic means have been together employed to operate automotive brakes, and I am aware that it has been proposed to provide a control mechanism to maintain a certain ratio of magnetic to manual brake applying effort, and such mechanism may be advantageously combined with the present invention tho it forms no part thereof, but the principle of so mounting the electro-magnetic device as to leave both of its elements movable, so as to use them in an equalizing capacity, I consider new and useful, therefore,

I claim—

1. Electro-magnetic equalizing brakes comprising, front wheel brakes, rear wheel brakes, a front brake shaft, a rear brake shaft, arms extending radially from the ends of the brake shafts, operative rods from said arms to said brakes, other arms extending radially from said shafts intermediate the first said arms, an electro-magnet suspended between said shafts with both of its elements free to move and rods connecting the two elements of the electro-magnet, one element to each said intermediate arm.

2. Electro-magnetic equalizing brakes comprising, front wheel brakes, rear wheel brakes, an electro-magnet suspended therebetween leaving both of its elements free to move, a source of current supply for said electro-magnet, operative connections from one element to the front wheel brakes and from the other element to the rear wheel brakes, means whereupon manual effort may be exerted to apply said brakes, and means associated with the manually operable means whereby the same said effort will connect said electro-magnet to said current source.

3. Electro-magnetic equalizing brakes comprising, front wheel brakes, rear wheel brakes, a front brake shaft, a rear brake shaft, arms extending radially from the ends of the brake shafts, operative rods from said arms to said brakes, other arms extending radially from said shafts intermediate the first said arms, a solenoid core pivotally connected to the end of an arm on one said shaft, a solenoid coil adapted to receive said core pivotally connected to the end of an arm on the other said shaft, and means to operate said solenoid.

4. Brake mechanism comprising, in combination, two sets of brakes, manually operable brake applying mechanism, power means supported to float thereupon, and a single member associated with said manually operable mechanism whereby the power means may be utilized to apply the brakes independently of or concurrently with said manual brake applying mechanism.

5. Brake mechanism comprising, in combination, two sets of brakes, manually operable brake applying mechanism, power means supported to float thereupon and coupled through said brake applying mechanism with the brakes to exert brake applying effort thereon, and means carried by said manually operable brake applying mechanism connected with said power means whereby the same may be energized simultaneously with or independently of the manual application of the brakes.

In testimony whereof, I have hereunto signed my name.

VINCENT BENDIX.